(12) United States Patent
Fernández Aymerich et al.

(10) Patent No.: US 12,544,981 B2
(45) Date of Patent: Feb. 10, 2026

(54) FLEXIBILITY OF FEATURES OF AN OBJECT TO BE ADDITIVELY MANUFACTURED

(71) Applicant: Peridot Print LLC, Palo Alto, CA (US)

(72) Inventors: Ismael Fernández Aymerich, Sant Cugat del Valles (ES); Roger Fadurdo Orellana, Sant Cugat del Valles (ES); Arnau Codina Saborit, Sant Cugat del Valles (ES); Cristina Dominguez Manchado, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 366 days.

(21) Appl. No.: 18/033,334

(22) PCT Filed: Oct. 30, 2020

(86) PCT No.: PCT/US2020/058347
§ 371 (c)(1),
(2) Date: Apr. 22, 2023

(87) PCT Pub. No.: WO2022/093276
PCT Pub. Date: May 5, 2022

(65) Prior Publication Data
US 2023/0391012 A1 Dec. 7, 2023

(51) Int. Cl.
*B29C 64/386* (2017.01)
*A46B 1/00* (2006.01)
(Continued)

(52) U.S. Cl.
CPC ............. *B29C 64/386* (2017.08); *A46B 1/00* (2013.01); *B29L 2031/42* (2013.01); *B33Y 50/00* (2014.12); *B33Y 80/00* (2014.12)

(58) Field of Classification Search
CPC ....... B29C 64/386; B29C 64/165; A46B 1/00; B29L 2031/42; B29L 2031/718;
(Continued)

(56) References Cited

U.S. PATENT DOCUMENTS 10,392,512 B2 8/2019 Emamjomeh et al.
10,647,053 B2 5/2020 Erickson et al.
(Continued)

FOREIGN PATENT DOCUMENTS

CN 108885643 A 11/2018
CN 110167744 A 8/2019
(Continued)

*Primary Examiner* — Michael J Brown
(74) *Attorney, Agent, or Firm* — Michael Dryja (57) ABSTRACT

In an example, a method includes identifying, by processing circuitry, a feature of less than a threshold size of an object to be generated in additive manufacturing. In some examples the method further includes determining, by processing circuitry, a first density of a print agent to be applied to build material when generating the identified feature of the object based on an intended flexibility of the feature of the object. The method may further include determining, by processing circuitry, a second density of print agent to be applied to build material when generating another feature of the object.

17 Claims, 5 Drawing Sheets

(51) Int. Cl.
*B33Y 50/00* (2015.01)
*B22F 10/14* (2021.01)
*B29L 31/42* (2006.01)
*B33Y 80/00* (2015.01)
*G06F 30/17* (2020.01)

(58) Field of Classification Search
CPC ......... B33Y 50/00; B33Y 80/00; B33Y 10/00; B22F 2203/15; B22F 2207/17; B22F 10/14; B22F 10/38; B22F 10/80; G06F 2113/10; G06F 30/17
USPC ....................................................... 700/119
See application file for complete search history.

(56) References Cited

U.S. PATENT DOCUMENTS

| | | | |
|---|---|---|---|
| 11,338,507 B2 * | 5/2022 | Zhao | .................... B29C 64/393 |
| 2011/0260365 A1 | 10/2011 | El-Siblani | |
| 2016/0200045 A1 | 7/2016 | Hopkins et al. | |
| 2017/0239891 A1 | 8/2017 | Buller et al. | |
| 2018/0009157 A1 * | 1/2018 | Gutierrez | ............... B33Y 50/02 |
| 2018/0017956 A1 | 1/2018 | Garcia Reyero Vinas et al. | |
| 2019/0095555 A1 | 3/2019 | Lopez et al. | |
| 2019/0118263 A1 | 4/2019 | Buller et al. | |
| 2020/0233400 A1 | 7/2020 | Wright et al. | |
| 2021/0060862 A1 | 3/2021 | Lebron et al. | |
| 2021/0299967 A1 | 9/2021 | Hartman et al. | |

FOREIGN PATENT DOCUMENTS

| | | |
|---|---|---|
| CN | 110831741 A | 2/2020 |
| WO | 2017/157455 A1 | 9/2017 |
| WO | 2018/136048 A1 | 7/2018 |
| WO | 2019/013746 A1 | 1/2019 |
| WO | 2019/013749 A1 | 1/2019 |

* cited by examiner

FLEXIBILITY OF FEATURES OF AN OBJECT TO BE ADDITIVELY MANUFACTURED

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be determined from structural design data). The fusing agent may have a composition which absorbs energy such that, when energy (for example, heat) is applied to the layer, the build material to which it has been applied heats up, coalesces and solidifies, upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. Such a fusing agent may comprise any or any combination of an infra-red light absorber, a near infra-red light absorber, a visible light absorber and a UV light absorber. Examples of fusing agents comprising visible light absorption enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed to reduce coalescence. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer determining a three-dimensional model of an object to be generated, for example using a computer aided design (CAD) application. The model may define the solid portions of the object. To generate a three-dimensional object from the model using an additive manufacturing system, the model data can be processed to define slices or parallel planes of the model. Each slice may define a portion of a respective layer of build material that is to be solidified or caused to coalesce by the additive manufacturing system.

Additive manufacturing may be an attractive process to replace other manufacturing techniques, however, there is a cost associated with adopting new manufacturing processes which can prohibit a user adopting the new manufacturing process. For example, a user may wish to match the physical properties of an object generated using the new process to those of an object generated using an existing process, however the time, cost and resources to match the properties may be so great that they at least appear to outweigh the benefits of implementing the new process.

Figure 1:
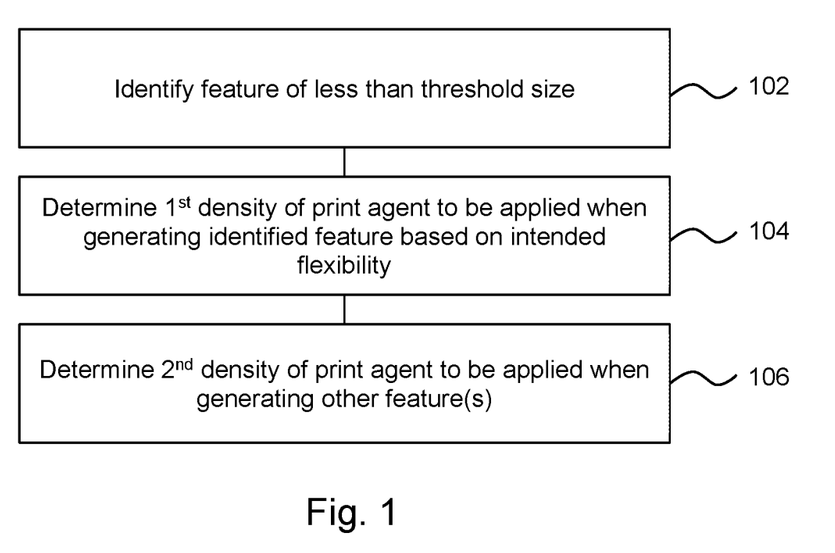
FIG. 1 is a flowchart of an example method of determining a density of fusing agent to be used in additive manufacturing.

FIG. 1 is an example of a method, which may comprise a computer implemented method for determining a density of fusing agent to be used in additive manufacturing.

The method comprises, in block 102, identifying, by processing circuitry, a feature of less than a threshold size of an object to be generated in additive manufacturing. Features of less than the threshold size may also be referred to herein as small features, and in some examples, they are features which may have certain physical properties which can be affected by the density of fusing agent which is used when generating that feature, such as flexibility. In some examples, small features are identified, so that they can be treated differently to larger features during additive manufacturing to ensure they are formed as intended or formed with particular intended properties.

Identification of features of less than the threshold size in an object to be generated may be performed by analysing an object model representing the object to be generated to determine if there is a portion of the object model which is less than the threshold size. For example, a dimension such as a cross sectional dimension, a length dimension and/or a cross sectional area may be compared to a predetermined threshold. The object model data may represent at least a portion of an object to be generated by an additive manufacturing apparatus by fusing a build material. In some examples, an object portion may comprise a layer of an object, for example a layer to be formed in a layer-by-layer manufacturing process such as additive manufacturing. The object model data may for example comprise a Computer Aided Design (CAD) model, and/or may for example be a STereoLithographic (STL) data file.

Object model data may comprise features of various sizes. Certain features may be relatively small, or relatively small within a layer. There may be a minimum feature size which can be generated by a given additive manufacturing apparatus, for example a finite resolution in relation to the accuracy with which build material and/or print agents may be placed. Some techniques allow for accurate placement of print agent on a build material, for example by using print heads operated according to inkjet principles of two dimensional printing to apply print agents, which in some examples may be controlled to apply print agents with a resolution of around 600 dpi or 1200 dpi. At 600 dpi, this theoretically means that features as small as 42 microns could be generated, depending on the thickness of the layers used to generate the object. However, as noted above, energy may be applied (for example using heat lamps) to cause the build materials to fuse, and such small areas of agent-treated build material may not absorb enough energy to reach the fusing temperature of the build material, wherein the fusing temperature may be a temperature at which build material is at least substantially entirely caused to melt such that it will coalesce and fuse to form, upon cooling, a solid portion of the object. Thus, in practice, in some examples, the minimum 'printable' feature size may be determined not by the resolution of the object generation apparatus but by the temperature that such a feature can reach during the fusing process. However, any threshold may be set in block 102, which may be set independently of the resolution of the object generation apparatus, and therefore may be larger than the minimum printable feature size.

In some examples, block 102 may comprise identifying small features which have additional dimensional features and/or geometrical characteristics such as an aspect ratio. For example, the features may have a relatively small cross section and a relatively long length, for example comprising needle-, wire-, filament- and/or bristle-like features, or comprising beams or struts. For example, a ratio may be determined comparing a cross sectional dimension with a length dimension to identify such features. In some examples, this may be compared with a threshold, such as for example a threshold maximum cross-sectional dimension and/or a threshold minimum length dimension to be identified as a feature of less than a threshold size of an object.

Analysing object model data to identify such small features may comprise various methods, examples of which are described in more detail below.

The method comprises, in block 104, determining, by processing circuitry (which may be the same as the processing circuitry used in block 102), a first density of a print agent to be used when generating the identified feature of the object based on an intended flexibility of the feature of the object. In some examples, the print agent is a fusing agent. The physical properties of an object generated in additive manufacturing may depend on the type of build material used and the type of solidification mechanism as described above. However, the physical properties may also be affected by processing parameters used in the additive manufacturing process, such as temperature or the type and quantity of agents used. For example, if a higher density of fusing agent is deposited within a feature of an object during generation the feature may absorb more heat and reach higher temperatures for a longer time, resulting in increased fusing of build material at that location, which may be referred to as "overmelt", relative to a location with a lower density of fusing agent. Therefore, applying a higher density of fusing agent to some features can increase rigidity and decrease flexibility. Conversely, a lower density of fusing agent may result in a feature having a relatively high flexibility. In some examples the density of fusing agent may be referred to as an area coverage (for example, x drops per $cm^2$).

The physical properties of smaller features may be more susceptible to influence by varying the density of fusing agent than larger features. For example, a relatively small change in fusing agent density in a small feature may result in a relatively substantial change in physical properties, whereas a similar change in fusing agent for other, larger, features may not have any perceptible impact on the physical properties of that feature. For example, in the case where the physical property is flexibility, a large feature may be relatively rigid due to its larger size, whereas smaller features (including in particular bristle-like features) may be relatively flexible, and varying the fusing agent density (without making any changes to the composition of the fusing agent itself) can affect how flexible they are.

Certain objects may have a predetermined intended flexibility. For example, the object may have been previously manufactured using a different process and a user may wish for the properties of the object when manufactured using additive manufacturing to match the properties of the object when manufactured using the previous process. Therefore, the intended flexibility may be the flexibility of the feature when manufactured using the previous process. In other examples, the intended flexibility of a feature may be related to an intended function of a generated object.

The method of FIG. 1 further comprises, in block 106, determining, by processing circuitry (which may be the same as the processing circuitry used in block 102 and/or 104), a second density of print agent to be applied when generating another feature of the object, for example when generating other features which are greater than the threshold size. In some examples, the print agent is a fusing agent. In some examples a standard, or default, density of fusing agent is used as the second density for generating the other feature(s). For example, the first density may be determined to be different to the second density. As described in more detail below, in some examples a first default, or initial density is used to determine the first density and/or a second (different) default or initial density is used to determine the second density, wherein these densities may be modified prior to generating the object, such that a local density of fusing agent deposited may be different from the first and/or second default/initial densities. In some examples the first default density is not modified and the second default density may be modified. For example, the second default density may be modified based on a predicted temperature of build material in each location, whereas the first density may be based on the intended flexibility without considering the predicted temperature of the feature. This may for example reflect the potential for larger thermal gradients and/or deformation in 'bulk' object portions (i.e. those portions which are not small portions) than in the identified small features. In some examples the modification of initial or default density may vary across an object portion. For example, local adjustments may be made to the amount of fusing agent applied. In some examples, the second density may be an average density of fusing agent to be applied to the bulk object portion, and/or a local density to be applied within the bulk object portion. For example, the second density may be a local density determined based on a default or initial density.

Figure 2:
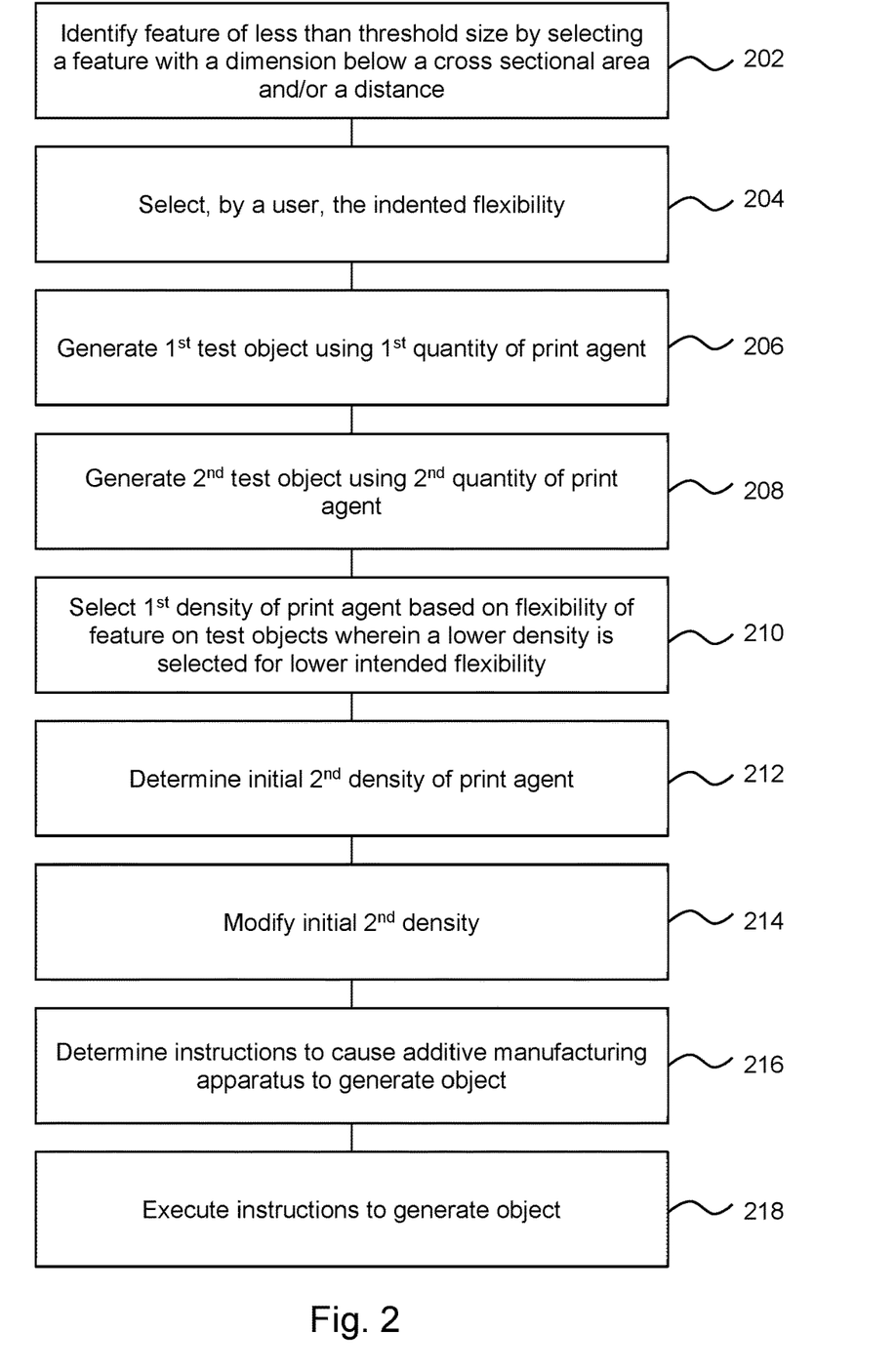
FIG. 2 is a flowchart of an example method for generating objects in additive manufacturing.

FIG. 2 shows an example of a process which may comprise a computer implemented method for generating objects in additive manufacturing. In this example, it may be intended to generate an object having particular qualities, referred to herein as a 'production object'. Indeed, it may be intended to mass produce instances of the production object. The method comprises, in block 202, identifying, by processing circuitry, a feature of less than a threshold size of the production object, when generated, wherein identifying the feature comprises selecting a feature with a dimension below a threshold size. In this example, the dimension is a cross sectional area and/or a distance between opposing faces of the feature. The method may comprise determining dimensions of a feature, for example a length or width of the feature and comparing this determined dimension to the threshold. In some examples, the distance may be a minimum distance between opposing faces. In other examples, a slice through the object may be analysed and the cross-sectional area of a feature determined. The threshold may be predetermined, and may correspond to a size below which flexibility may be significantly impacted by fusing agent density. In some examples, the length of the feature may also be considered, for example such that the feature has at least a threshold length, or a predetermined ratio with cross section dimension or area (for example, a predetermined aspect ratio).

In this example the intended flexibility is selectable by a user and the method comprises, in block 204, selecting, by a user, the intended flexibility. A user may specify the flexibility they intend a feature of the production object to have when it is generated, and the density of fusing agent may be determined based on the selection by the user, for example based on a lookup table or the like. In other examples, rather than selecting an intended flexibility, a user may select a density of fusing agent to be used when generating small features. In some examples the relationship between the density of fusing agent and flexibility is predictable and/or predetermined, and so the density of fusing agent may be selected accordingly. However, in this example, test objects are generated to assist in determining the density of fusing agent to use in the production object. In some examples, the object model representing the object to be generated may define the intended flexibility for features of the object and selecting the intended flexibility may comprise obtaining the intended flexibility from the object model.

The method comprises, in block 206, generating a first test object using a first candidate density of print agent when generating the identified feature. The print agent may be a fusing agent. The first test object may be generated using the same object model as the production object which is intended to be generated, thereby generating a test object which resembles the production object to be generated. In other examples a portion of the object model may be used, wherein the portion comprises the identified feature. In other examples the test object may be different to the object model of the production object intended to be generated and may be an abstract representation of the identified feature, for example it may comprise a feature of similar dimensions and/or shape.

The method comprises, in block 208, generating a second test object using a second candidate density of print agent when generating the identified feature. The print agent may be the same type of print agent to that used in block 206. In examples, the print agent may be a fusing agent. It may be noted that, as the feature being generated is nominally the same as the feature generated in block 208, as the first and second candidate quantities are different, the density of application of print agent in each case is also different. The second test object may be generated using substantially identical instructions to the first test object, with the exception of the quantity of fusing agent used to generate the identified feature. When the density of fusing agent is substantially constant throughout the identified small feature, using a different quantity of fusing agent to generate the small feature results in a different density of fusing agent being deposited. In some examples further test objects are generated to characterise the space of possible fusing agent quantities, and their relationship with flexibility. In an example set out below in relation to FIG. 4B, five test objects may be generated, wherein each uses a different density of fusing agent to build or generate the identified feature but are otherwise substantially the same. Thus, in this example, the quantity of fusing agent used to generate the feature differs for different objects. In other examples more, or fewer, test objects each using a different density of fusing agent to build the identified feature may be generated, for example based on how accurately the relationship between fusing agent density and flexibility is to be determined.

The method comprises, in block 210, selecting the first density of print agent based on the flexibility of the feature on the first test object and the flexibility of the feature on the second test object (or more generally based on the flexibility of the feature on a plurality of test objects). In some examples the flexibility of the feature on each test object may be measured to determine the flexibility of the feature and the test object which is closest to the intended flexibility selected. The first density may then be set to the density used when generating the selected test object. For example, a plurality of test objects may be generated, each using a different density of print agent for generating identified features. The flexibility of the feature(s) of each test object may be measured and the object which comprises feature(s) with a flexibility best matched to the intended flexibility may be identified, and the density of print agent used to generate the feature in that object is used when generating the feature of the object in production. In other examples an interpolation between measurements of flexibility may be used to determine the first density. For example, the flexibility of the feature(s) of each test object may be measured and the measured flexibility of the feature(s) on each of the test objects used to characterise the relationship between density of fusing agent and flexibility, for example using line fitting, a regression analysis, such as a linear regression or polynomial regression. In such examples, a density of fusing agent to produce a flexibility which is between that of two test objects may be extrapolated or interpolated based on the relationship.

In this example a lower first density is selected for higher intended flexibility and lower first density for higher intended flexibility.

In some examples each test object may be generated in a separate build process (i.e. one test object in the fabrication chamber at a time), however in other examples multiple test objects may be generated in a single build process (i.e. multiple test objects in the fabrication chamber, each using a different density to generate the identified feature). Generating multiple objects within a single build process may reduce the time taken for characterising fusing agent density. Although in this example multiple test objects are generated, in some examples a single object may be generated with a plurality of features corresponding to the identified feature, wherein each of the plurality of features is generated using a different density of fusing agent.

In some examples, the method comprises determining a relationship between the fusing agent density, flexibility and dimensions of the feature of the object to be generated. In these examples the fusing agent density may be determined based on measurements of flexibility of features of objects with different dimensions, for example the fusing agent density may be determined as a function of the intended flexibility and feature dimension. Therefore, it may be possible to determine the fusing agent density to achieve an intended flexibility without generating test objects for every possible feature dimension.

The method comprises, in block 212, determining an initial second density of print agent to be applied when generating other features of the object. The second density of print agent may be determined as described in relation to block 106 of FIG. 1.

The method comprises, in block 214, modifying the initial second density. In some examples determining the second density comprises modifying the initial second density value for at least one location on a layer of build material. In some examples, the initial density value is modified based on at least one of a predicted or measured temperature distribution within a build chamber, a location of the object within a build chamber, proximity of the object to another object to be generated within the build chamber and/or anticipated distortions of the object. This further modification may be to improve dimensional accuracy or quality of the generated object by accounting for shrinkage, warping or distortions induced by the build and cooling process. While the initial second density may be the same for all object portions with which it is associated (e.g. bulk object portions), the modification of the second density may vary across such portions. For example, a lower density may be used in the location of a predicted hotspot in the object. In some examples, the bulk portions may be printed with the print agent at a second density which is an average density, and the local density with which the print agent is applied may be based on the initial second density, but may vary between locations. In other examples, the second density may be a local density to be used within the object portions, and may be determined based on the initial second density. Thus, in some examples, a plurality of second densities may be determined, based on an initial or default density. In some examples the first density is determined in a similar manner to the second density, although as noted above this modification may be performed in relation to object portions which are not identified as small features (which as noted above may be referred to herein as 'bulk' object portions), and not in relation to small features. In some examples, small features may be less susceptible to any of hotspots, deformation and/or temperature gradients. In this way, the density of fusing agent applied to small features may be controlled with a consideration for the flexibility, without additional consideration of such thermal control, whereas thermal control (e.g. local modifications to print agent amounts) may be applied to bulk object portions.

The method comprises, in block 216, determining additive manufacturing instructions, or print instructions, which when executed by an additive manufacturing apparatus, cause the additive manufacturing apparatus to generate the object using the first density of print agent when generating the feature, and using print agent amounts based on a modification of the initial second density to print another object portion. The instructions may comprise instructions to specify an amount of agent, such as print agent, fusing agent or detailing agent, to be applied to each of a plurality of locations on a layer of build material. For example, determining print instructions may comprise determining 'slices' of a virtual fabrication chamber containing at least one virtual object, and rasterising these slices into pixels. For example, an amount of print agent (or no print agent) may be associated with each of the pixels in order to provide, on average, the first density in the location of the feature. In general, if a pixel of a slice relates to a region of a fabrication chamber which is intended to be solidified, the print instructions may be determined to specify that fusing agent should be applied to a corresponding region of build material in object generation. If however a pixel relates to a region of the fabrication chamber which is intended to remain unsolidified, then print instructions may be determined to specify that no agent, or a coalescence modifying agent such as a detailing agent, may be applied thereto. In addition, the amounts of such agents may be specified in the print instructions. For example, for fusing agents, these amounts may be determined based on the first and second densities.

The method comprises, in block 218, executing the instructions to generate the object. For example, this may comprise forming a layer of build material, applying print agents, for example through use of 'inkjet' liquid distribution technologies in locations specified in object model data for an object model slice corresponding to that layer using at least one print agent applicator, and applying energy, for example heat, to the layer. Some techniques allow for accurate placement of print agent on a build material, for example by using printheads operated according to inkjet principles of two-dimensional printing to apply print agents, which in some examples may be controlled to apply print agents with a resolution of around 600 dpi, or 1200 dpi. A further layer of build material may then be formed, and the process repeated, for example with the object model data for the next slice.

Figure 3:
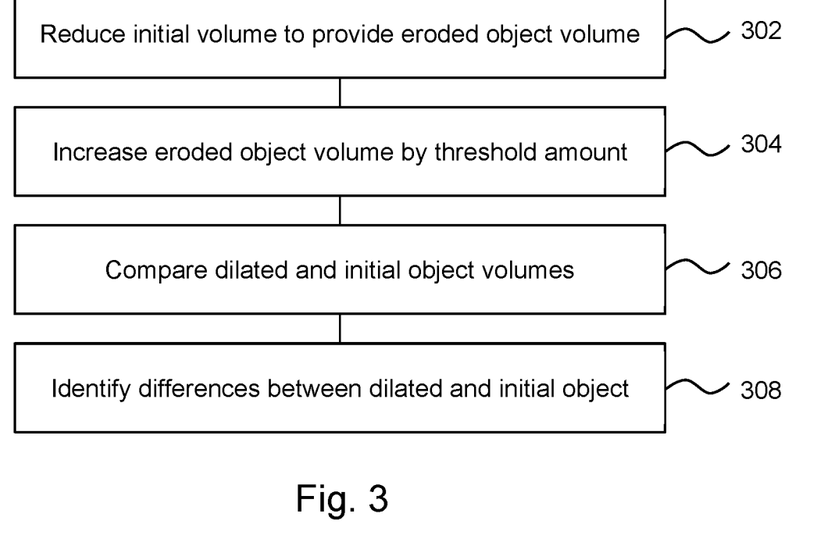
FIG. 3 is a flowchart of an example method of identifying small features of an object to be generated in additive manufacturing.

FIG. 3 shows an example of a process which may comprise a computer implemented method for identifying small features of an object to be generated in additive manufacturing, and may be performed in place of block 102 of FIG. 1 or block 202 of FIG. 2. The method comprises, in block 302, reducing an initial volume of the object by a threshold amount in at least one spatial dimension to provide an eroded object volume. In this example, the initial object volume is reduced by eroding in two spatial dimensions within a layer (i.e. the layer is treated as a two-dimensional plane). For example, if the layer comprises a slice along the Z axis in an XY plane, the object portion may be eroded in the X and Y dimensions. In other examples, if an object portion is associated with a depth (for example, a depth which varies across the object portion), it may be eroded in three dimensions. For example, the object portion may be eroded by around 1-3 mm, or 1-5 mm in each of the X and Y dimensions. This example threshold amount may be determined on the basis that, features of this size may be associated with an intended flexibility which may be controlled by fusing agent density. In other examples, the threshold may differ, for example based on materials. In practical terms, in this example, eroding the initial object volume by 1 mm comprises determining an inner perimeter which is 1 mm from any remaining edge.

The method comprises, in block 304, increasing the eroded object volume in the at least one spatial dimension by the threshold amount to provide a dilated object volume. Features which are less than a threshold size will be completely eroded and therefore not restored by this dilation, whereas features which are above a threshold size will be restored and so can be identified.

The method comprises, in block 306, comparing the dilated object volume to the initial object volume and, in block 308, identifying differences between the dilated object volume and the initial object volume as a candidate feature of less than a threshold size. In some examples, any feature of an object/object portion which is present in the initial object volume and absent in the dilated object volume may be identified as being a small feature. In other examples, a user and/or object model data may indicate which of the identified features are to be associated with an intended flexibility (and in some examples, different features may be associated with different intended flexibilities), with other features having a default flexibility and/or being associated with a default print agent density.

In other examples, small features may be identified in some other way. For example, a distance between opposed faces in a mesh model of an object, or a count of voxels in a cross section of an object feature may be determined. In still further examples, a user may 'tag' features as small features. In other examples, as noted above, an aspect ratio of feature(s) may be considered. Combinations of these methods may be used in some examples.

Figure 4A:
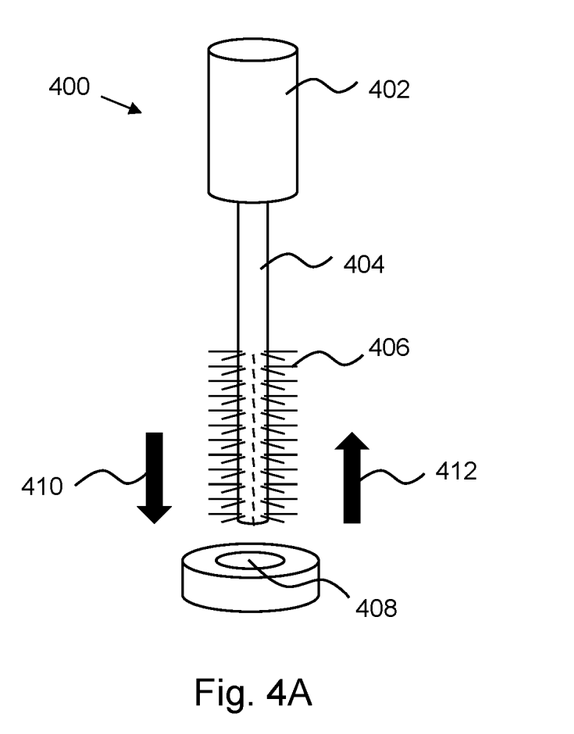
FIG. 4A is a simplified schematic drawing of an example of an object generated in additive manufacturing.

FIG. 4A depicts an example of an object 400 which may be generated in additive manufacturing. The object 400 comprises a flexible feature of less than a threshold size generated using a first density of fusing agent and a feature of greater than the threshold size generated using a second density of fusing agent, wherein the second density of fusing agent is greater than the first density of fusing agent.

In this example the object 400 is a brush, and the flexible feature is each of a plurality of bristles 406. The object 400 also comprises features greater than the threshold size, in this example a handle portion 402 and a shaft 404. The features greater than the threshold size (i.e. in this example, the handle 402 and the shaft 404) may be rigid or relatively rigid relative to the bristles 406. This is at least in part due to their larger size and/or the greater density of fusing agent used when generating those parts of the object.

The handle 402 is located at a first end of the shaft 404 and bristles 406 extend from the shaft 404 near its second opposing end. In some examples the brush 400 may be used for application of cosmetics, such as mascara. In other examples the object may be a different type of brush such as a toothbrush or hairbrush, or a brush for use in a machine. In other examples the object may be an object such as a sponge or foam material (e.g. for use in shoe insoles) which comprises a network of small interconnected portions, and/or may have a mesh-like form, or being formed with narrow struts.

In some examples, the first density used to generate the object is substantially constant throughout generation of the first feature. The second density may be an average density, and the density of fusing agent may vary throughout generation of the second feature. As the second feature is larger, it may be subject to thermal gradients which may cause overheating and/or distortions introduced in the building and cooling processes, so additional variations in fusing agent density may be used throughout the second feature to compensate for these effects.

In this example the small features of the object 400 which are identified by the method are bristles 406 of the brush 400. The bristles 406 may be identified as described above, for example the cross-sectional diameter or area of a bristle 406 may be compared to a threshold, and the bristle 406 identified if the diameter or area is less than the threshold. In other examples, the erosion and dilation method described in FIG. 3 may be used, or a user may indicate on the object model that the bristles are intended to be flexible, or some other method may be used to identify the small features.

To measure flexibility of the bristles 406 of the brush 400, the brush 400 may be inserted and removed from an aperture 408. The force used to push the brush 400 through the aperture in a first direction 410 may be measured as a function of the distance moved by the brush 400. Similarly, the force used when removing the brush 400 from the aperture 408 may be measured when the brush is moved in a second direction 412.

Figure 4B:
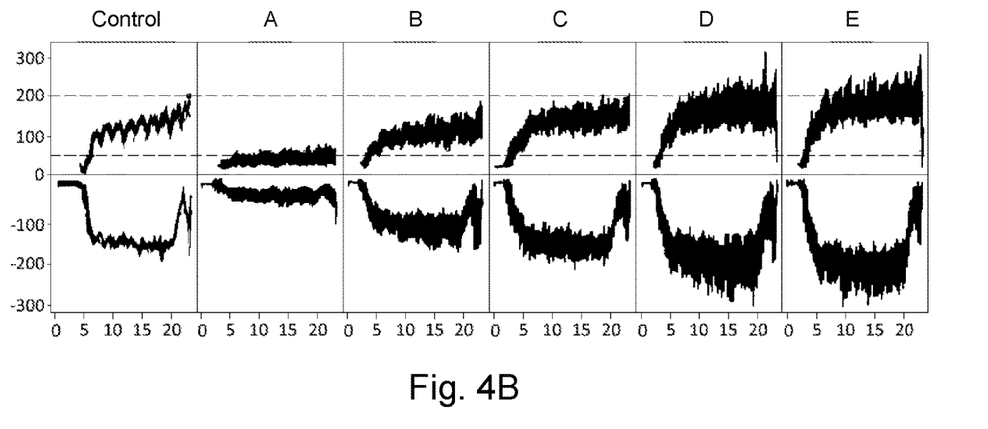
FIG. 4B is a graph showing examples of force used to insert and remove brushes from an aperture.

FIG. 4B is a series of six graphs which depict the force used to insert and remove brushes from an aperture. The first graph is labelled "Control" and the other graphs are labelled with letters A to E. All six graphs share a common vertical axis which is the force applied to the brush in grams. The horizontal axis shows displacement of the brush in millimetres i.e. how far the brush 400 has moved relative to the aperture 408. Each of the six graphs shows two sets of data: data above the zero line and below. The data below the zero line represents the force applied to move the brush in the first direction 410 and the lines above the zero line represent the force applied to move the brush in the second direction 412. For brushes with a high flexibility a lower force will be used when inserting and removing the brush 400 from the aperture 408 and for brushes 400 with a low flexibility a higher force will be used when inserting and removing the brush 400 from the aperture 408.

The control graph shows the force to insert and remove a brush having been manufactured (for example, using another manufacturing technique than that described herein) to have intended qualities. Each of the graphs labelled A to E represent five brushes (brushes A to E) manufactured by additive manufacturing, wherein the bristles of each are made with a different density of fusing agent. Brush A is made with the lowest density of fusing agent in its bristles, and each subsequent brush from B to E is made with increasing fusing agent density in its bristles. As can be seen brush A takes the least force to be inserted and removed from the aperture (the bristles are relatively flexible) and brush E takes the most force to be inserted and removed from the aperture (the bristles are relatively stiff). Each of the brushes A to E are test objects that have been generated in order to determine a density of fusing agent to match the additive manufacturing process to the control brush. The dotted lines represent the target range of force. As can be seen the bristles of brush A are 'too flexible' when compared to the control brush and therefore the fusing agent density used in the bristles of brush A is too low. Conversely, the bristles of brushes D and E are 'not flexible enough' when compared to the control brush and therefore the fusing agent density used in the bristles of brushes D and E is too high. The force used for brushes B and C compares favourably with the control brush. Therefore, a fusing agent density equal to or between that used to generate the bristles of brushes B and C may be used in production of further brushes.

Figure 5:
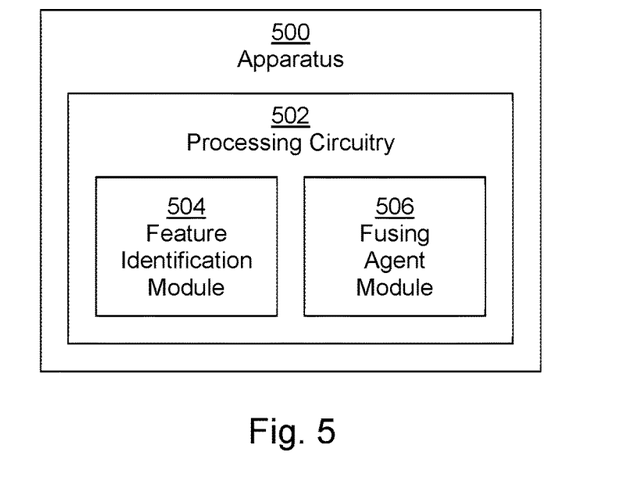
FIG. 5 is a simplified schematic drawing of an example of apparatus for processing data for additive manufacturing.

FIG. 5 shows an example of apparatus 500 comprising processing circuitry 502. The processing circuitry 502 comprises a feature identification module 504 and a fusing agent module 506.

In use of the apparatus 500, the feature identification module 504 identifies, in object model data, features of an object to be generated in additive manufacturing which are less than a threshold size. The feature identification module 504 may identify features which are less than the threshold size by performing the method described in block 102 of FIG. 1, block 202 of FIG. 2 and/or or blocks 302 to 308 of FIG. 3.

In use of the apparatus 500, the fusing agent module 506 determines an area coverage (e.g. volume or drops of print agent per unit area) of fusing agent to be applied to build material when generating the object based on a correlation of fusing agent density and flexibility of the identified features of the object when generated. The fusing agent module 506 may determine the area coverage to be applied when generating the identified feature of the object by determining a density of fusing agent to be applied when generating the identified feature and other features of the object. The fusing agent module 506 may determine different area coverages to use when generating different portions of the object, for example a different area coverage may be determined for the identified feature relative to other features. The area coverage may be determined in a manner similar to the first density, and may be considered to be analogous thereto. A second area coverage for generating other features may be determined in a manner similar to the second density, and may be considered to be analogous thereto.

Figure 6:
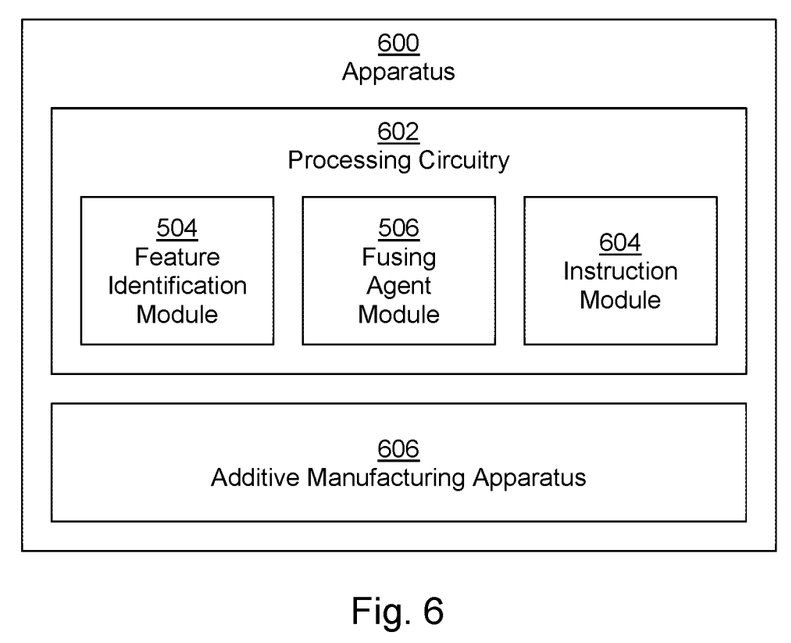
FIG. 6 is a simplified schematic drawing of an example apparatus for additive manufacturing.

FIG. 6 shows an example of an apparatus 600, which comprises processing circuitry 602. The processing circuitry 602 comprises the modules of the processing circuitry 502 of FIG. 5. The processing circuitry 602 further comprises an instruction module 604 and the apparatus 600 further comprises an additive manufacturing apparatus 606 to generate objects according to the object generation instructions. In use of the apparatus, the fusing agent module 506 is further to determine a first area coverage of fusing agent to be applied when generating the identified feature and a second area coverage of fusing agent to be applied when generating other features. For example, the fusing agent module 506 may determine the first area coverage, or density, to apply when generating the identified feature according to block 102 of FIG. 1 or block 210 of FIG. 2 and determine the second area coverage, or density, to apply when generating the other features according to block 104 of FIG. 1 or block 212 of FIG. 2.

In use of the apparatus, the instruction module 604 is to create object generation instructions, which instruct an additive manufacturing apparatus to generate the object using the first area coverage of fusing agent when generating the identified features and based on the second area coverage of fusing agent when generating other features.

The object generation instructions (which may also be referred to as print instructions) may, in use thereof, control the additive manufacturing apparatus 606 to generate each of a plurality of layers of the object. This may for example comprise specifying area coverage(s) for some print agents such as fusing agents, colorants, detailing agents and the like. In some examples, object generation parameters are associated with object model sub-volumes (voxels or pixels). In some examples, the print instructions comprise a print agent amount associated with sub-volumes. In some examples, other parameters, such as any, or any combination of heating temperatures, build material choices, an intent of the print mode, and the like, may be specified. In some examples, halftoning may be applied to determine where to place fusing agent in order to provide the first and second area coverages, or where to place other print agents.

The additive manufacturing apparatus 606 may, in use thereof, generate an object in a plurality of layers (which may correspond to respective slices of an object model) according to the print instructions. For example, this may comprise generating at least one object in a layer-wise manner by selectively solidifying portions of layers of build material. The selective solidification may in some examples be achieved by selectively applying print agents, for example through use of 'inkjet' liquid distribution technologies, and applying energy, for example heat, to the layer. The additive manufacturing apparatus 606 may comprise additional components not shown herein, for example any or any combination of a fabrication chamber, a print bed, printhead(s) for distributing print agents, a build material distribution system for providing layers of build material, energy sources such as heat lamps and the like.

The processing circuitry 502, 602 may in some examples carry out any or any combination of the blocks of FIG. 1, 2 or 3.

Figure 7:
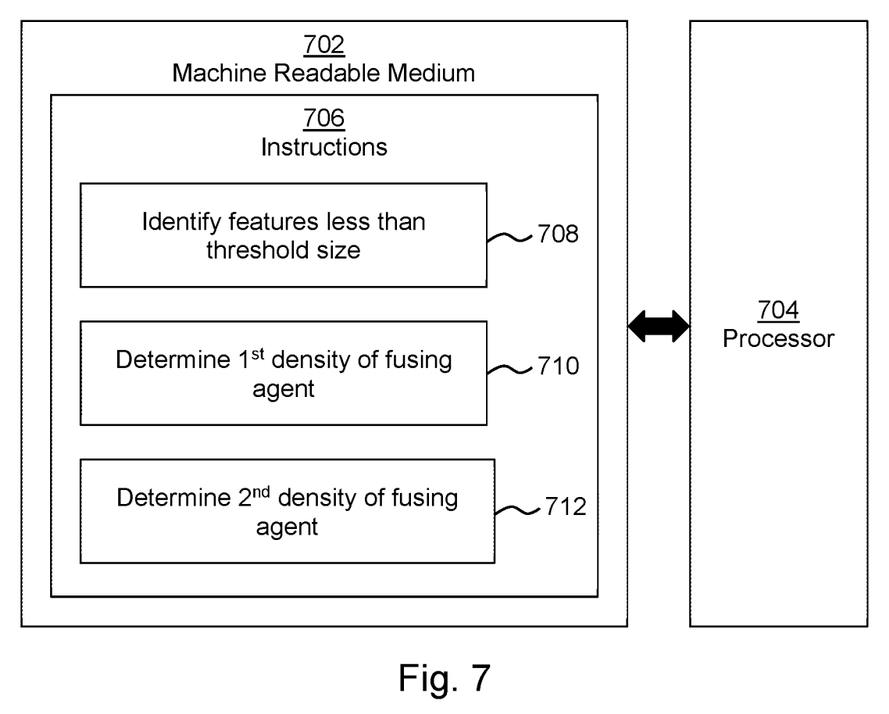
FIG. 7 is a simplified schematic drawing of an example machine readable medium associated with a processor.

FIG. 7 shows a machine readable medium 702 associated with a processor 704. The machine readable medium 702 comprises instructions 706 which, when executed by the processor 704, cause the processor 704 to carry out tasks.

The machine readable medium 702 may include instructions, when executed by the processor 704, cause the processor 704 to carry out any or any combination of the blocks of FIG. 1, FIG. 2 or FIG. 3. In some examples, the instructions may cause the processor to act as any part of the processing circuitry 502, 602 of FIG. 5 or FIG. 6.

In this example, the instructions 706 comprise instructions 708 to cause the processor 704 to identify features of an object to be generated in additive manufacturing which are less than a threshold size. Features of less than the threshold size may be identified by performing the method described in block 102 of FIG. 1, block 202 of FIG. 2 or blocks 302 to 308 of FIG. 3 and/or the instructions 708 may provide the feature identification module 504.

In this example, the instructions 706 comprise instructions 710 to cause the processor 704 to determine a first density of fusing agent which when applied to a build material when generating the identified features results in a feature with a predetermined flexibility. Determining the first density to apply when generating the identified feature may be performed according to block 104 of FIG. 1 or block 210 of FIG. 2 and/or the instructions 710 may provide the fusing agent module 506.

In this example, the instructions 706 comprise instructions 712 to cause the processor 704 to determine a second density of fusing agent to be applied when generating other feature(s) of the object. The second density may be an average density. Determining the second density to apply when generating the other features may be performed according to block 106 of FIG. 1 or block 212 and 214 of FIG. 2.

The instructions 706 may further comprise instructions to determine instructions to generate the object. The determined instructions may comprise instructions to use the first density of fusing agent when generating the identified features and use a second density of fusing agent when generating other features.

The instructions to generate the object, when executed by an additive manufacturing apparatus, cause the additive manufacturing apparatus to generate the object using the first density of fusing agent when generating the identified features and using the second density of fusing agent when generating other features, wherein in some examples the second density is greater than the first density. The instructions 712 may provide the instruction module 604.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices (such as the feature identification module 504, the fusing agent module 506 and/or the instruction module 604) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
identifying, by processing circuitry, a feature of less than a threshold size of an object to be generated in additive manufacturing, by:
reducing an initial volume of the object by a threshold amount in at least one spatial dimension to provide an eroded object volume;
increasing the eroded object volume in the at least one spatial dimension by the threshold amount to provide a dilated object volume;
comparing the dilated object volume to the initial object volume; and
identifying differences between the dilated object volume and the initial object volume as a candidate feature of less than a threshold size;
determining, by processing circuitry, a first density of a print agent to be applied to build material when generating the identified feature of the object based on an intended flexibility of the feature of the object;
determining, by processing circuitry, a second density of print agent to be applied to build material when generating another feature of the object; and
additively manufacturing the object such that the print agent is applied at the determined first density when generating the identified feature of the object and is applied at the determined second density when generating the another feature of the object.

2. The method of claim 1, wherein identifying the feature comprises:
selecting a feature with a dimension below a threshold size.

3. The method of claim 2, wherein the dimension is either or both of a cross sectional area and a distance between opposing faces of the feature.

4. The method of claim 1, wherein determining the first density of print agent comprises:
generating a first test object using a first candidate density of print agent when generating the identified feature;
generating a second test object using a second candidate density of print agent when generating the identified feature; and
selecting the first density of print agent based on the flexibility of the feature on the first test object and the flexibility of the feature on the second test object.

5. The method of claim 1, wherein the determined first density is higher for lower intended flexibility and lower for higher intended flexibility.

6. The method of claim 1, wherein the intended flexibility is selectable by a user.

7. The method of claim 1, wherein determining the second density comprises:
determining an initial density value; and
modifying the initial density value for at least one location on a layer of build material based on one or more than one of:

a predicted or measured temperature distribution within a build chamber;

a location of the object within a build chamber;

proximity of the object to another object to be generated within the build chamber; and anticipated distortions of the object.

8. The method of claim 1, wherein the object is a brush, and the feature is a bristle of the brush.

9. A non-transitory computer-readable data storage medium storing instructions executable by processing circuitry to perform processing comprising:

identifying a feature of less than a threshold size of an object to be generated in additive manufacturing;

determining a first density of a print agent to be applied to build material when generating the identified feature of the object based on an intended flexibility of the feature of the object;

determining a second density of print agent to be applied to build material when generating another feature of the object, by:

determining an initial density value; and modifying the initial density value for at least one location on a layer of build material based on one or more than one of:

a predicted or measured temperature distribution within a build chamber;

a location of the object within a build chamber;

proximity of the object to another object to be generated within the build chamber; and anticipated distortions of the object; and causing the object to be additively manufactured such that the print agent is applied at the determined first density when generating the identified feature of the object and is applied at the determined second density when generating the another feature of the object.

10. The non-transitory computer-readable data storage medium of claim 9, wherein identifying the feature comprises:

selecting a feature with a dimension below a threshold size.

11. The non-transitory computer-readable data storage medium of claim 10, wherein the dimension is either or both of a cross sectional area and a distance between opposing faces of the feature.

12. The non-transitory computer-readable data storage medium of claim 9, wherein identifying the feature comprises:

reducing an initial volume of the object by a threshold amount in at least one spatial dimension to provide an eroded object volume;

increasing the eroded object volume in the at least one spatial dimension by the threshold amount to provide a dilated object volume;

comparing the dilated object volume to the initial object volume; and identifying differences between the dilated object volume and the initial object volume as a candidate feature of less than a threshold size.

13. The non-transitory computer-readable data storage medium of claim 9, wherein determining the first density of print agent comprises:

generating a first test object using a first candidate density of print agent when generating the identified feature;

generating a second test object using a second candidate density of print agent when generating the identified feature; and selecting the first density of print agent based on the flexibility of the feature on the first test object and the flexibility of the feature on the second test object.

14. The non-transitory computer-readable data storage medium of claim 9, wherein the determined first density is higher for lower intended flexibility and lower for higher intended flexibility.

15. The non-transitory computer-readable data storage medium of claim 9, wherein the intended flexibility is selectable by a user.

16. The non-transitory computer-readable data storage medium of claim 9, wherein the object is a brush, and the feature is a bristle of the brush.

17. A method comprising:

identifying, by processing circuitry, a feature of less than a threshold size of an object to be generated in additive manufacturing;

determining, by processing circuitry, a first density of a print agent to be applied to build material when generating the identified feature of the object based on an intended flexibility of the feature of the object;

determining, by processing circuitry, a second density of print agent to be applied to build material when generating another feature of the object; and additively manufacturing the object such that the print agent is applied at the determined first density when generating the identified feature of the object and is applied at the determined second density when generating the another feature of the object, wherein the object is a brush, and the feature is a bristle of the brush.

* * * * *